United States Patent [19]

Zoller

[11] 4,260,655
[45] Apr. 7, 1981

[54] PROTECTIVE AND DECORATIVE MOLDING CONSTRUCTION

[75] Inventor: Robert A. Zoller, Bay Village, Ohio

[73] Assignee: The Standard Products Company, Cleveland, Ohio

[21] Appl. No.: 955,595

[22] Filed: Oct. 30, 1978

Related U.S. Application Data

[63] Continuation-in-part of Ser. No. 790,532, Apr. 25, 1977, abandoned.

[51] Int. Cl.³ .................... B60R 13/02; B60R 13/04; B32B 15/02
[52] U.S. Cl. .................................... 428/31; 428/114; 428/295; 428/378; 428/379; 428/416; 428/460; 428/463; 293/121; 293/128
[58] Field of Search ................ 49/490, 491, 492, 495, 49/496, 497; 52/716; 428/31, 358, 374, 380, 383, 295, 379, 123, 114, 378, 416, 460, 463; 293/121, 126, 128, 144; 156/244.12, 244.23

[56] References Cited

U.S. PATENT DOCUMENTS

| | | | |
|---|---|---|---|
| 1,655,164 | 1/1928 | Schemmel | 428/123 |
| 1,880,698 | 10/1932 | Beynon | 428/379 X |
| 2,226,354 | 12/1940 | Barr | 49/496 |
| 3,703,421 | 11/1972 | Fisher | 156/244.12 |
| 3,770,545 | 11/1973 | Jackson | 428/31 X |

FOREIGN PATENT DOCUMENTS

| | | | |
|---|---|---|---|
| 1249271 | 11/1960 | France | 293/71 R |
| 47-14844 | 1/1972 | Japan | 49/496 |

OTHER PUBLICATIONS

Webster's New World Dictionary, p. 456, 2nd Ed., definition of "Embed".

Primary Examiner—George F. Lesmes
Assistant Examiner—Alexander S. Thomas
Attorney, Agent, or Firm—Harness, Dickey & Pierce

[57] ABSTRACT

A molding suitable for use as a decorative and protective trim for motor vehicles, comprising an elongated plastic body bendable to conform to external contours of a vehicle and containing therein a plurality of parallel, laterally spaced, longitudinally extending wires bonded to the plastic and formed of metal wire having a low modulus of elasticity and which is capable of stretching beyond its elastic limit to take a permanent set when the molding is bent in, or at an oblique angle with respect to, a common plane occupied by at least two of the wires, thereby stabilizing the overall bent shape of the molding.

7 Claims, 4 Drawing Figures

U.S. Patent
Apr. 7. 1981
4,260,655
FIG. 1.
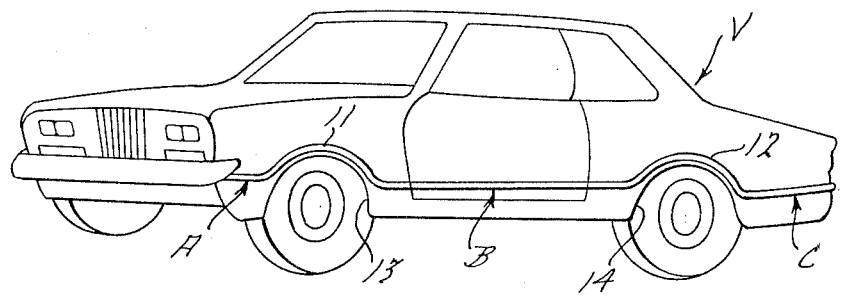
FIG. 2.
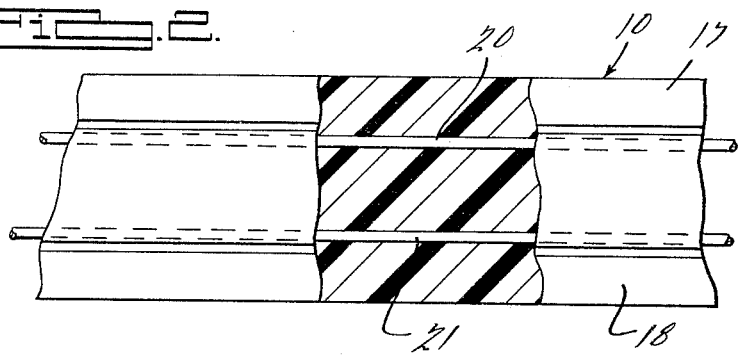
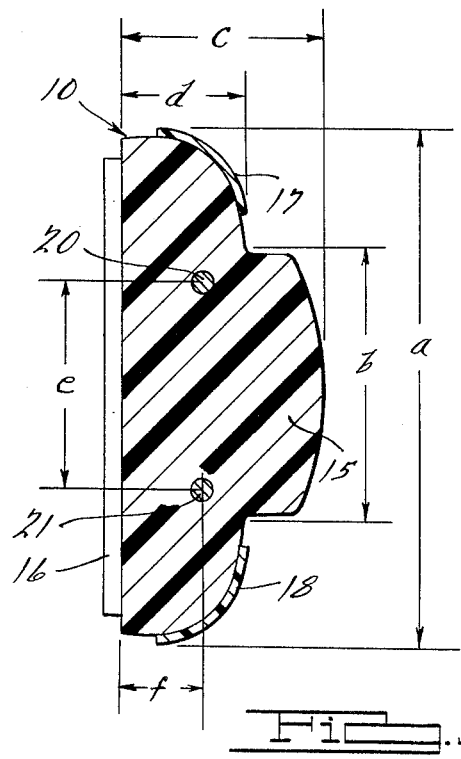
FIG. 3.
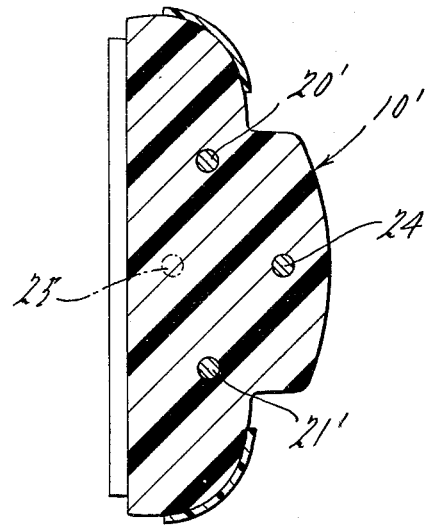
FIG. 4.

PROTECTIVE AND DECORATIVE MOLDING CONSTRUCTION

CROSS REFERENCE TO RELATED APPLICATION

The present application is a continuation-in-part of application Ser. No. 790,532 filed Apr. 25, 1977, now abandoned.

BACKGROUND OF THE INVENTION

Moldings of the type frequently referred to as "trim strips", which are secured to the sides and other areas of motor vehicles to provide ornamentation and protection against minor damage are, in modern practice, commonly formed of a plastic which possesses elastomeric properties and other characteristics rendering it superior to the metal formerly used. Such moldings are normally formed of an extruded solid vinyl body, to which a chrome-like or other suitable ornamental surfacing is frequently applied, by techniques already well known in the art. The plastic employed in moldings of the indicated nature intended for exterior installation although elastomeric, is relatively stiff, and where body contours might require its attachment in curved shapes, it frequently is not considered practical, and metal may be substituted. Since the plastic material is elastic, and has the "memory" which is characteristic of such plastics, it tends to return to its straight, extruded or initial form, and if it is installed on a curved surface, or is curved during installation, curved areas of the molding may tend to separate from the vehicle body. The metal moldings which were commonly used before the development of high-quality plastic moldings were normally preformed to desired contours by means of simple bending equipment prior to delivery to the body assembly line, the metal employed being of a character easily bendable beyond its elastic limit to the desired contouring so that it took a permanent set in the desired finished shape. Such treatment has not been feasible with plastic moldings of the indicated character, as heretofore commonly constructed. The overall objective of the present invention is to provide an improved molding adapted for external use on motor vehicles and which consists primarily of a solid plastic body containing therein a unique arrangement of stiffening wires which are capable of being stretched lengthwise beyond their elastic limit when the molding is bent, the arrangement being such that the distorted wires then effectively hold the molding in its bent contour.

A related object is to provide an improved plastic molding of light weight and low cost which is readily bendable, and stable when bent, and wherein only a very small amount of metal is incorporated but the metal is effective to impart such stabilized characteristics thereto.

A related object is to provide a molding having the indicated characteristics wherein the metal is completely embedded in the plastic and effectively prevented from corroding.

Another object is to provide such an improved molding which eliminates the need for post-extrusion stress annealing operations, and which is adapted to be economically manufactured in high volume production by conventional techniques.

Still another object is to provide such an improved non-corrosive, relatively resilient molding having all of the advantages of modern plastic moldings and which, in addition, can be formed to stable contours by means of conventional types of bending fixtures, and will thereafter retain its bent form during shipment, installation and use.

Other objects and advantages will become apparent upon consideration of the present disclosure in its entirety.

BRIEF DESCRIPTION OF THE FIGURES OF DRAWING

FIG. 1 is a somewhat diagrammatic perspective view of a motor car provided with a molding, or so-called "trim strip", embodying the present invention;

FIG. 2 is a fragmentary elevational view, partly broken away, showing a portion of the molding on a larger scale;

FIG. 3 is a cross section of the molding on a still larger scale; and

FIG. 4 is a view similar to FIG. 3 showing a modification.

DETAILED DESCRIPTION OF PREFERRED FORMS OF THE INVENTION

A motor vehicle generally designated V is diagrammatically illustrated in FIG. 1 and shown as provided with a decorative and protective molding formed in three sections, comprising a front section generally designated A secured to the front fender area, a mid section B secured to the door of the vehicle as an aligned rearward continuation of section A, and a rear section C secured to the rear fender of the vehicle as a further aligned rearward continuation. Sections A and C include curved areas, respectively designated 11 and 12, which are bent upwardly in the plane of the molding to extend arcuately around and outline the upper portions of the two wheel cut-out areas 13, 14.

As best shown in FIGS. 2 and 3, the molding comprises as extruded body generally designated 10 formed of a material such as polyvinylchloride having, typically, a durometer hardness of the order of 48, plus or minus 3, on the Shore D scale, 15 second delay method and has a typical tensile strength of 3870 PSI and 270% elongation. Although the specific configuration of the molding may of course vary, it is shown as of modified T cross section, having a central projecting rib or impact area 15. In such surface regions as may be desired for the sake of appearance, a chrome-like or other decorative coating may be applied to the outer surface of the body, as diagrammatically indicated at 17 and 18. An adhesive layer 16 is provided on the bottom surface of the body 10, by means of which the molding is adapated to be secured to the surface of the vehicle body.

A pair of parallel wires 20, 21 extend longitudinally within and uninterruptedly throughout the length of the plastic body 10. The wires are equidistant from the bottom surface and are spaced a substantial distance from each other. The wires are formed of a material having a low modulus of elasticity but substantial strength in compression, such as a mild steel, aluminum, or so-called soft iron, and they are incorporated in the body 10 by extruding the plastic material around them. The wires are initially coated with an epoxy phenolic acrylic primer or vinyl to metal adhesive such as "Denflex 2392", manufactured by Dennis Chemical Co., to cause the plastic to bond thereto. The primer is baked onto the wire and provides a bondable surface for the vinyl extrusion. Alternatively, or in addition, the wires may be mechanically interlocked with the plastic as by being roughened or provided with fine ridges or indentations which are too shallow to substantially affect its physical properties but of sufficient depth to provide a mechanical interlock between the plastic and the wire. The diameter, spacing, ductility and elastic modulus of the wire are such that when the molding is bent in the common plane occupied by the wires 20 and 21, as is necessary in the case of the portions 11 and 12 which bound the wheel cut-out areas 13 and 14, the radially outer wire (the wire 20 in the illustrated instance) is stretched longitudinally beyond its elastic limit. Inasmuch as the radially inner wire (21 in the illustrated instance) is not compressible to any material degree by such bending of the molding in the manner indicated, it will be appreciated that the outer wire 20 and the plastic material lying radially outwardly from the innermost wire 21 are stretched lengthwise. Due to the low elastic modulus of the wire, the strain resulting from bending the molding in the manner indicated causes a permanent elongation of the radially outer wire sufficient to correspond to the increased peripheral length required to maintain the desired curvature, the wire having been stressed beyond its elastic limit so that it takes a permanent set in the stretched condition. Thereafter, the wires strongly resist any tendency of the molding to return to the straight initial form, the effort of the plastic to straighten being resisted by the reaction of the wire 20 to the longitudinal compression which is exerted upon it by the plastic, inasmuch as the wire is highly resistant to axial compression, while the wire 21 is stressed in tension and thereby also resists restraightening of the molding. The molding accordingly preserves the contour imparted thereto by such bending in the plane of the wires.

Molding sections such as the sections 11 and 12 illustrated in FIG. 1, constructed as herein disclosed, can be preshaped, much as in the case of the metal trim strips formerly used in such applications and can be applied to the vehicle body without requiring the workmen to attempt to manually shape the molding or restrain it from straightening during installation. As noted above, this has frequently been impractical to attempt with previous types of plastic moldings. After attachment, any tendency of the bent molding to distort or separate from the body is effectively prevented by reason on the fact that it is stabilized in the bent shape by the interaction of the stretched and unstretched wires 20, 21.

It will be appreciated that the several variables which influence the ability of the molding to retain its bent shape include the dimensions and configuration of the molding, the physical characteristics of the plastic, the dimensions of the wires, the spacing of the wires, and the physical characteristics of the wires. It is accordingly infeasible to attempt to derive a mathematical formula which will enable predicting positively whether plastic moldings of various designs, with spaced wires therein, will retain their bent shape against the restraightening effort of the plastic. However, it has been found relatively easy to empirically construct such moldings with parallel wires arranged as shown and described. The drawings illustrate in proper proportions the successful molding which has been constructed. The body is formed of PVC of durometer 48, measured as indicated above. The wires are 0.031" diameter annealed low carbon steel with a typical tensile between 50,000 and 75,000 P.S.I. and bonded to the plastic by cementing as indicated above. The dimensions designated by small letters in FIG. 3, in inches, are as follows:

a=0.650
b=0.355
c=0.260
d=0.160
e=0.27
f=0.09

Such molding is readily bendable either by hand or on a bending machine, and will hold its bent shape.

Although "two" or "a pair" of wires have been referred to, it will be understood that while the described function is inherently accomplished by the spaced wires, two or more may be used, and "pair" of course means "at least" a pair.

In addition, as brought out in FIG. 4, wherein parts corresponding to those of the first embodiment are designated by like reference numerals primed, one or more additional wires may be incorporated, located in different planes, to stabilize bent formations in different planes. The molding 10' illustrated in FIG. 4 is shown as constructed in the same way as the molding of the first-described embodiment, except for the addition of a third wire 24 which is located on a central plane which is perpendicular to the base and at an outspaced position near the top of the impact rib 15'. Since the wire 24 is on the center plane, it does not intefere with bending the molding in the plane of wires 20', 21', inasmuch as such bending applies no appreciable axial stress to the wire 24. However, if the molding is bent in a plane at an angle to the common plane of wires 20', 21', an effect analogous to that already described occurs, the radially outer wire or wires being stretched and the radially inner wire or wires placed in compression. If the molding is bent so as to bow its end toward the back (and toward the vehicle body), as for example to conform to a convex surface, the wire 24 is stretched and wires 20', 21' placed in compression.

In a further modification a fourth wire is added at the position shown in dotted lines at 25. The wires 24 and 25 will then, when the molding is bent perpendicularly or at an angle to the back face (in or at an oblique angle to the plane of wires 24, 25), function similarly to the wires 20, 21 of the first embodiment.

This Detailed Description of Preferred Forms of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent and Trademark Office, and none of the foregoing descriptive material is intended to limit the scope of the appended claims.

What is claimed is:

1. A bendable molding including an elongated plastic body formed of a material which when bent tends to return to its initial shape and having embedded therein a pair of spaced parallel metallic wires extending lengthwise therein and confined against lateral movement in the body, means for securing said wires against longitudinal displacement with relation to the body, the wires being formed of a material having a modulus of elasticity low enough to be capable of being stretched beyond the elastic limit thereof without fracturing when the body is bent in the common plane of said wires, and being secured against longitudinal displacement firmly enough so that when the body is so bent, a radially outer wire is elongated with relation to a radially inner wire and said wires thereafter oppose return of the molding to its pre-bent shape, having a substantially planar bottom surface adapted to be secured to a supporting surface in contact therewith, the wires being substantially equidistant from said bottom surface and spaced from each other a distance which is a substantial proportion of the width of the molding, having a third wire in and also similarly confined and similarly secured with respect to the body and parallel to the wires of said pair but spaced from the common plane occupied by the wires of said pair, said third wire being formed of a material capable of being stretched beyond its elastic limit without fracturing when the body is bent in a plane which is at an angle to said common plane, said plastic body being extruded around the wires and the means for securing the wires comprising an adhesive which is applied to said wires prior to the extrusion of the plastic body thereabout.

2. A molding as defined in claim 1 wherein the means for securing the wires comprises an epoxy phenolic acrylic primer baked onto the wires and to which the body is bonded.

3. A bendable molding including an elongated plastic body of tensile strength of 3000 to 5000 P.S.I. formed of a material which when bent tends to return to its initial shape and having embedded therein a pair of spaced parallel metallic wires extending lengthwise therein and confined against lateral movement in the body, means for securing said wires against longitudinal displacement with relation to the body, the plastic body being extruded around the wires, the wires being formed of a material having a relatively low modulus of elasticity within the range of approximately 50,000 to 75,000 P.S.I. and capable of being stretched beyond the elastic limit thereof without fracturing when the body is bent in the common plane of said wires, and being secured against longitudinal movement firmly enough by means of an adhesive which is applied to said wires prior to the extension of said plastic body thereabout so that when the body is so bent, a radially outer wire is permanently elongated with relation to a radially inner wire and said wires thereafter oppose return of the molding to its prebent shape.

4. A bendable molding including an elongated plastic body formed of a material which when bent tends to return to its initial shape and having embedded therein a pair of spaced parallel metallic wires extending lengthwise therein and confined against lateral movement in the body, means for securing said wires against longitudinal displacement with relation to the body, the plastic body being extruded around the wires, the wires being formed of a material having a modulus of elasticity low enough to be capable of being stretched longitudinally beyond the elastic limit thereof without fracturing when the body is bent in the common plane of said wires, and being secured against longitudinal displacement firmly enough by means of an adhesive which is applied to said wires prior to the extension of said plastic body thereabout so that when the body is so bent, a radially outer wire is elongated with relation to a radially inner wire and said wires thereafter oppose return of the molding to its pre-bent shape.

5. A molding as defined in claim 1 or claim 4 including a second pair of wires parallel to the first pair and lying in a second common plane which is at an angle to the first-mentioned common plane, the wires of said second pair being similarly confined and secured with respect to the body and formed of a material capable of being stretched beyond its elastic limit when the body is bent in a plane which is at an angle to the first-mentioned common plane.

6. A molding as defined in claim 1 or claim 4 having a substantially planar bottom surface adapted to be secured to a supporting surface in contact therewith, the wires being substantially equidistant from said bottom surface and spaced from each other a distance which is a substantial proportion of the width of the molding, and wherein the body is polyvinylchloride having a durometer hardness of the order of 45 to 51 on the Shore D scale, 15 second delay method, and has a typical tensile strength of the order of 3870 PSI and elongation of the order of 270%, and the means for securing the wires comprises an adhesive bond between the wires and body.

7. A molding as defined in claim 6 wherein the means for securing the wires comprises an epoxy phenolic acrylic primer baked onto the wires and to which the body is bonded.

* * * * *